United States Patent [19]

Williams et al.

[11] Patent Number: 5,653,566
[45] Date of Patent: Aug. 5, 1997

[54] DEVICE AND METHOD FOR LOADING A BOAT TRAILER AND BOAT ONTO A VEHICLE

[76] Inventors: Jack R. Williams, P.O. Box 528; Gary L. Inman, P.O. Box 1978, 199 Veteran, both of Westport, Wash. 98595

[21] Appl. No.: 538,896

[22] Filed: Oct. 4, 1995

Related U.S. Application Data

[63] Continuation-in-part of Ser. No. 408,635, Mar. 22, 1995, abandoned.

[51] Int. Cl.⁶ ..................................................... B60P 3/10
[52] U.S. Cl. ............................ 414/462; 414/786; 414/483; 280/402; 280/414.3
[58] Field of Search ........................................ 414/462, 482, 414/483, 786; 280/402, 414.1, 414.2, 414.3; 410/3, 51

[56] References Cited

U.S. PATENT DOCUMENTS

| | | |
|---|---|---|
| 3,435,970 | 4/1969 | Sutton . |
| 3,478,908 | 11/1969 | Clark . |
| 3,720,334 | 3/1973 | Permut et al. . |
| 3,811,697 | 5/1974 | Armstrong ............................ 280/43.18 |
| 3,874,535 | 4/1975 | Killer . |
| 3,989,265 | 11/1976 | Smiley ................................ 280/414 R |
| 4,003,485 | 1/1977 | Edgerton . |
| 4,087,014 | 5/1978 | Schadle . |
| 4,175,905 | 11/1979 | Garrison et al. .......................... 414/462 |
| 4,191,316 | 3/1980 | Baumgartner ....................... 224/42.03 B |
| 4,268,209 | 5/1981 | Westerman ............................... 414/462 |
| 4,293,267 | 10/1981 | Grove ....................................... 414/462 |
| 4,331,346 | 5/1982 | Walters ................................... 280/414.1 |
| 4,381,069 | 4/1983 | Kreck ..................................... 224/42.44 |
| 4,439,086 | 3/1984 | Thede ........................................ 414/462 |
| 4,470,745 | 9/1984 | Shotwell ................................... 414/462 |
| 4,635,835 | 1/1987 | Cole ........................................ 224/42.08 |
| 4,907,934 | 3/1990 | Holladay .................................. 414/462 |

*Primary Examiner*—Karen B. Merritt
*Assistant Examiner*—Gregory A. Morse
*Attorney, Agent, or Firm*—Seed and Berry LLP

[57] ABSTRACT

A loading device uses a hitch to support a boat trailer and boat in an elevated position on the rear of a camper. A first member attaches to the aft end of the boat trailer, a second member attaches to the rear of the camper, and latches on the first member engage dogs on the second member to pivotably couple the members together. A winch line is attached at one end to the fore end of the boat trailer and at an opposing end to a winch mounted on the camper. The winch can thus raise the fore end of the boat trailer and thereby rotate the boat trailer about a pivot point through the dogs from a pre-loading horizontal position on the ground to an elevated position supported on the rear of the camper. The loading device is thus mechanically simple because it only needs a hitch, a winch, and a winch line. It is also power efficient because it only pivots the boat trailer, rather than lifting it and then moving it laterally.

21 Claims, 6 Drawing Sheets

DEVICE AND METHOD FOR LOADING A BOAT TRAILER AND BOAT ONTO A VEHICLE

This is a continuation-in-part of a prior application filed Mar. 22, 1995 and having Ser. No. 08/408,635, now abandoned.

TECHNICAL FIELD

This invention relates in general to a loading device and method, and in particular to a device and method for loading a secondary vehicle such as a boat trailer onto the rear of a primary vehicle.

BACKGROUND OF THE INVENTION

People often use small boats in a variety of sporting activities because they are conveniently portable. While some people transport their boats on a trailer, many others carry their boats on the top of a car or truck, because a trailer can be awkward to tow.

Small boats are often difficult to load onto the top of a vehicle because of their bulk and weight. Since many people use their boats by themselves, it can be especially difficult for them to load their boats alone. As a consequence, a variety of boat loading devices are available to lift a boat from the ground and load it onto the top of a vehicle.

These known boat loading devices are often mechanically complex because they have to lift a boat up and then move it laterally in order to place it on the top of a vehicle. They also require a lot of power from an electric motor or a crank to lift a boat. Also, if a boat detaches from a known loading device while a vehicle is in motion, the boat can damage the vehicle or itself as it falls. Finally, known loading devices cannot be used with some vehicles because they place a boat on top of a vehicle and, as a result, can increase the height of the vehicle beyond the legal limit.

Therefore, there is a need in the art for an inventive loading device which is mechanically simple and power efficient. The loading device should keep a vehicle and a boat from damage if the boat detaches from the device during transit, and it should add less height to a vehicle so it can be used with a wider variety of vehicles.

SUMMARY OF THE INVENTION

An inventive loading device uses a support, such as a hitch, to support a secondary vehicle, such as a trailer and boat, in an elevated position on the rear of a primary vehicle, such as a truck. A first member attaches to a first end of the secondary vehicle, a second member attaches to the rear of the primary vehicle, and releasable connectors, such as latches, couple the members. A horizontal axis pivot is located in one of the members. A winch line is attached at one end to a second end of the secondary vehicle, and at an opposing end to a winch supported on the primary vehicle. The winch can thus raise the second end of the secondary vehicle and thereby rotate the secondary vehicle about the horizontal axis pivot from a pre-loading substantially horizontal position to an elevated position in which the secondary vehicle is supported from the rear of the primary vehicle by the support.

The inventive loading device is thus mechanically simple because it only needs a support, a winch, and a winch line. It is also power efficient because it only pivots the secondary vehicle, rather than lifting it and then moving it laterally. Further, if the secondary vehicle includes a trailer and boat, and the trailer and boat detach from the loading device during transit, they will safely pivot to the ground, thus saving the primary vehicle, the trailer and the boat from damage. Finally, the loading device adds less height to a primary vehicle, because the secondary vehicle is positioned on the rear of the primary vehicle rather than on the top. As a result, the loading device can be used with a wider variety of primary vehicles without violating legal height limits for those vehicles.

DETAILED DESCRIPTION OF THE INVENTION

Figure 1A:
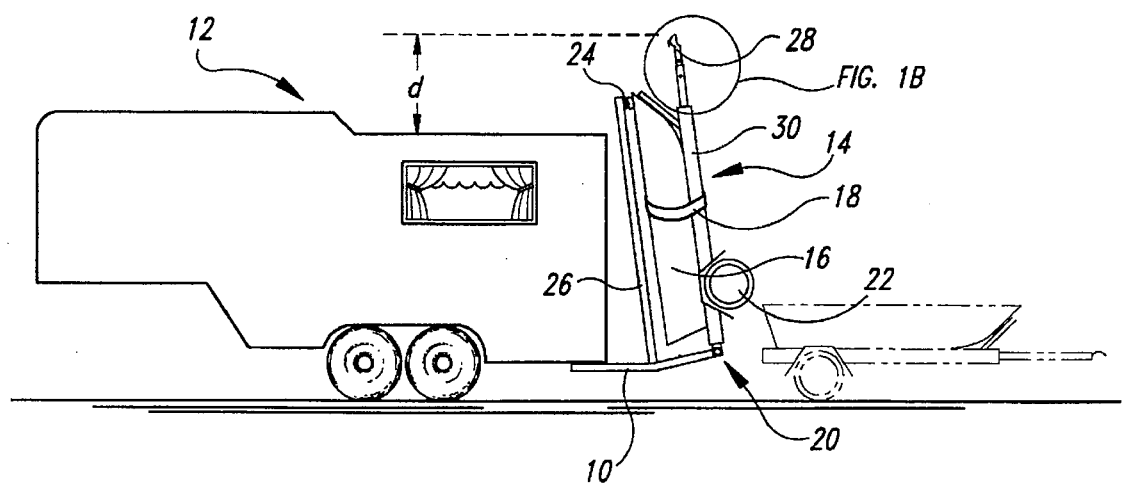
FIGS. 1A and 1B are side views of a preferred loading device according to the present invention.

In a preferred loading device shown in FIG. 1A, a support, such as a hitch 10, is attached to the underside of the rear of a primary vehicle, such as a fifth-wheel trailer 12. Although the present invention will be described with respect to a fifth-wheel trailer, it will be understood that a wide variety of primary vehicles are suitable for use with the present invention, including trucks, campers, vans and cars.

A secondary vehicle, such as a boat trailer 14, carries a boat 16 held on, for example, by a strap 18. Although the present invention will be described with respect to a boat trailer, it will be understood that a wide variety of secondary vehicles are suitable for use with the present invention, including motorcycles, three-wheelers, snowmobiles, and jet skis.

Releasable connectors, such as latches (not shown), couple the aft end of the boat trailer 14 to the hitch 10. As a result, a winch line (not shown) and a winch (not shown) can lift the fore end of the boat trailer 14 so the boat trailer 14 rotates about a horizontal axis pivot 20 from a horizontal position in which it is supported by support wheels 22 on the ground to an elevated position loaded on the fifth-wheel trailer 12. In the elevated position, the boat 16 rests against a cushion 24 on a vertical support member 26 attached to the hitch 10.

Figure 1B:
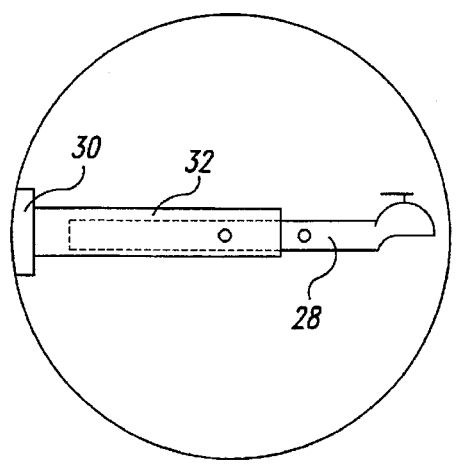

A telescoping tongue 28 of a carriage frame 30 of the boat trailer 14 is shown in FIG. 1B. The tongue 28 slides into and out of a tubular projection 32 of the carriage frame 30. As a result, a distance d that the tongue 28 extends above the top of the fifth-wheel trailer 12 can be minimized so the total height of the fifth-wheel trailer 12 meets legal requirements.

Figure 2:
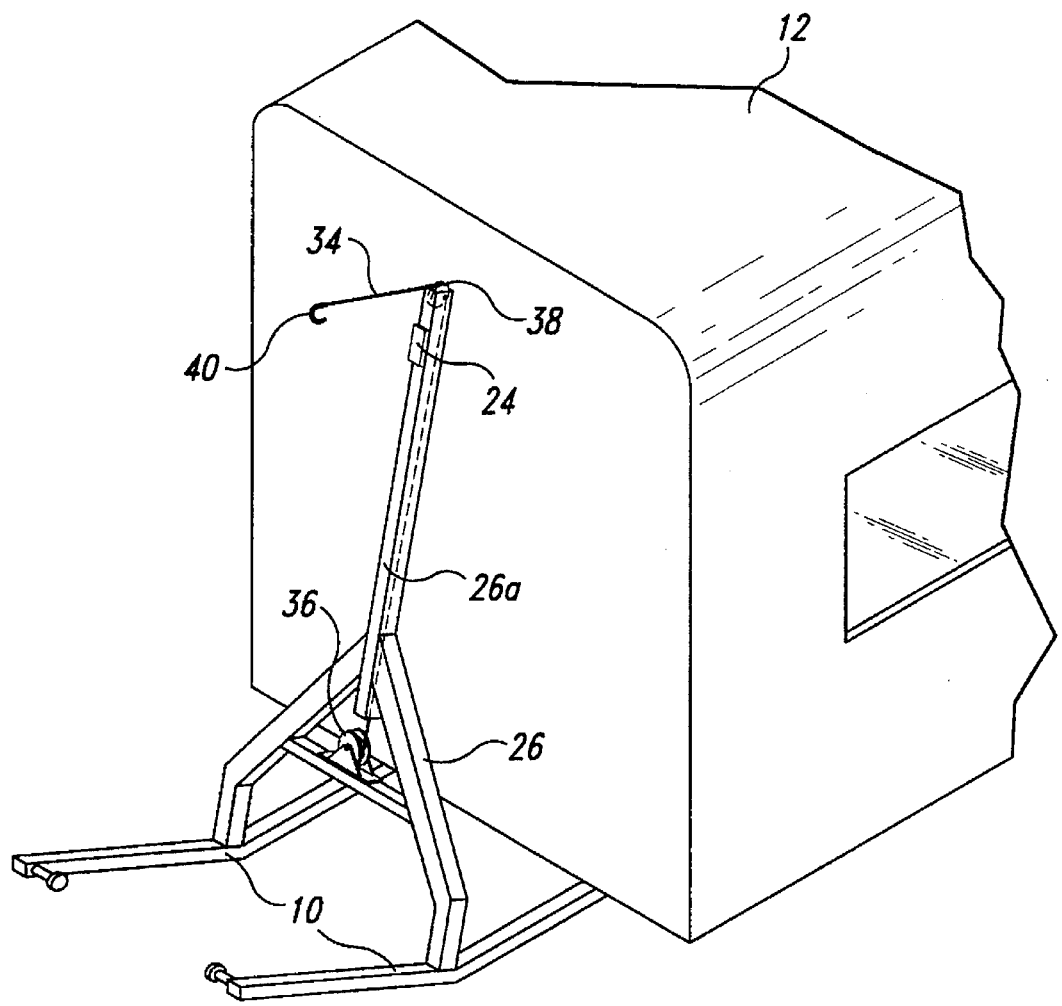
FIG. 2 is an isometric view of a hitch, winch and winch line in the loading device of FIGS. 1A and 1B.

The vertical support member 26 is shown in more detail in FIG. 2. Although the support member 26 is shown having a generally A-frame structure, it will be understood that a variety of structures are satisfactory for use with the present invention.

A winch line 34 extends continuously from a winch 36 mounted on the support member 26, through a portion 26a of the support member 26, over a guide 38, such as a pulley, mounted in the support member 26, and to a connecting device, such as a hook 40. When the hook 40 is connected to the boat trailer (not shown), and the aft end of the boat trailer is coupled to the hitch 10, the winch 36 can draw the winch line 34 in to lift the fore end of the boat trailer so the boat trailer rotates to an elevated position loaded on the fifth-wheel trailer 12 with the boat (not shown) resting against the cushion 24, as discussed above. Of course, the winch 36 can also let the winch line 34 out to lower the boat trailer to the ground. Although the winch 36 is shown mounted on the support member 26, it could be mounted in any, suitable position, as long as the winch line 34 is supported in an elevated position, such as by the guide 38. Also, although the winch 36 is shown as a single unit, it could be a drum (not shown) coupled to an electric motor (not shown) or a manual crank (not shown).

Figure 3:
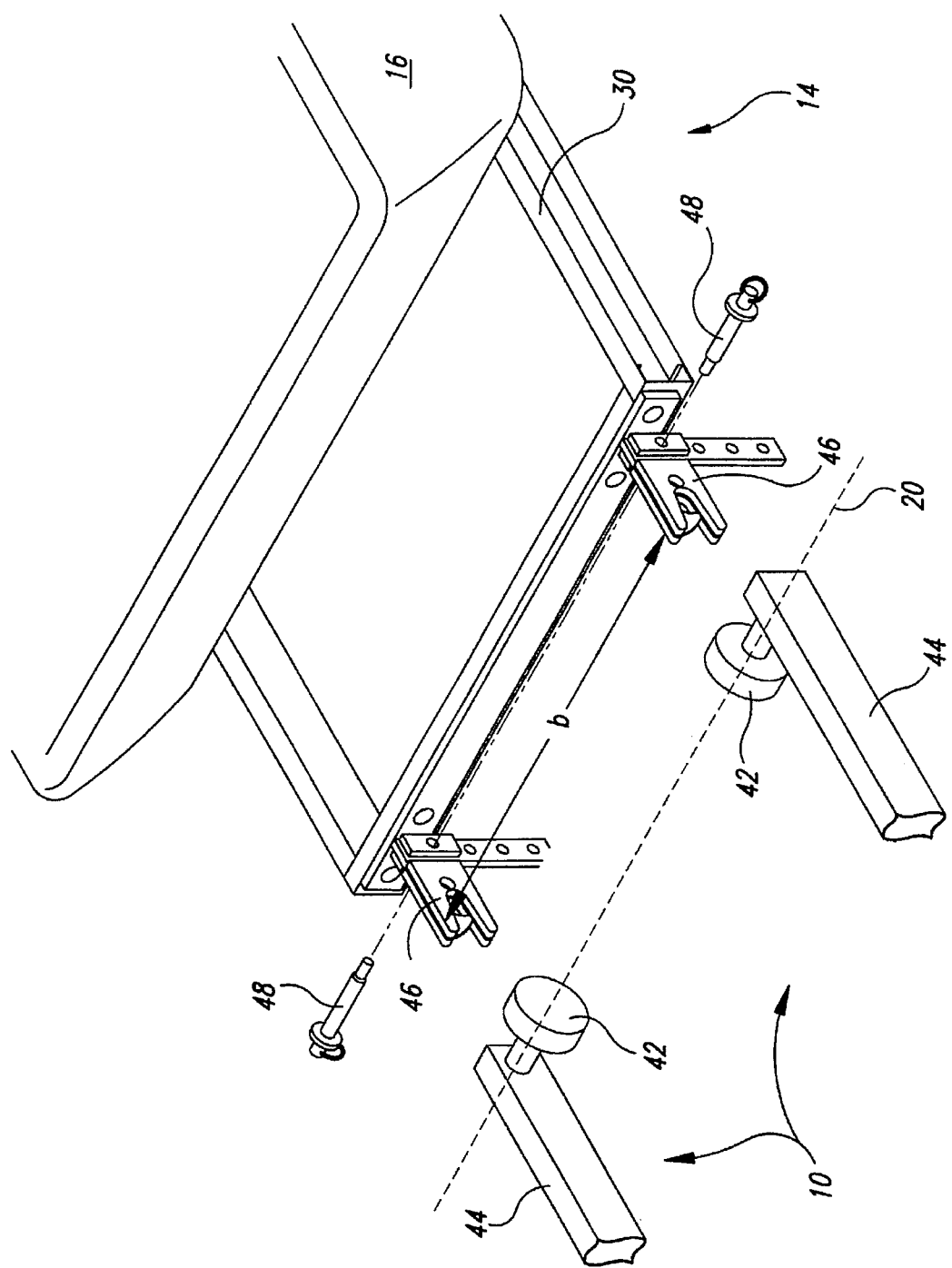
FIG. 3 is an isometric and exploded view of the hitch of FIG. 2 coupling to the carriage frame of a trailer.

The hitch 10 is shown in more detail in FIG. 3. Dogs 42 are fixed to fore-and-aft extending members 44 of the hitch 10, and pivotably couple to latches 46 attached to the carriage frame 30 of the boat trailer 14. As a result, the boat trailer 14 can rotate about the horizontal axis pivot 20. Also, the latches 46 are fixed at a distance b from each other so that they are viewable around the boat 16 from a location near the fore end of the boat trailer 14. Consequently, a person pushing the boat trailer 14 toward the hitch 10 can guide the latches 46 onto the dogs 42. Further, the height of the latches 46 is adjustable by first sliding the latches 46 up or down and then inserting pins 48 into holes in the latches 46.

Figure 4A:
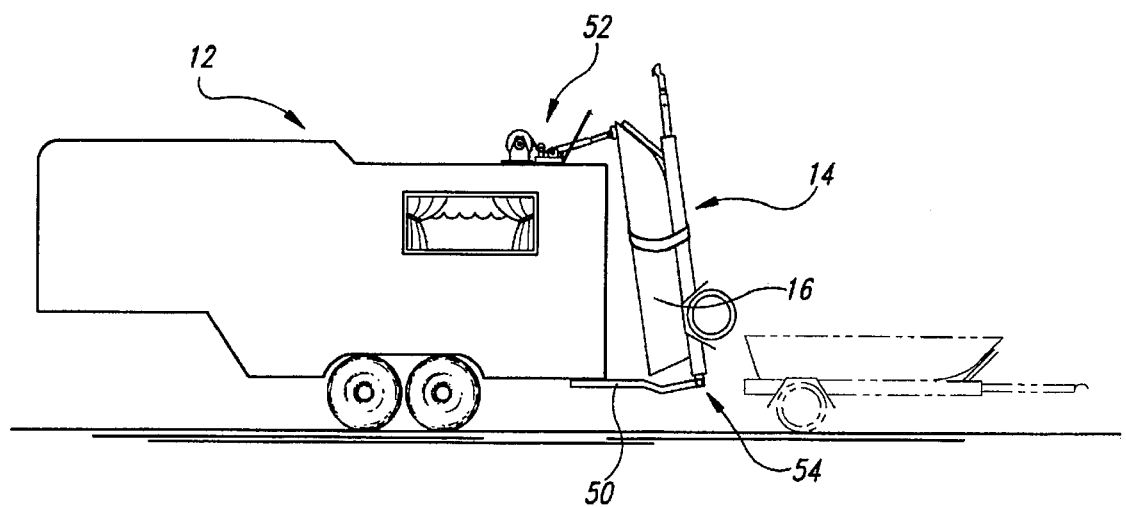
FIGS. 4A, 4B and 4C are side views of an alternative loading device according to the present invention.

In an alternative loading device shown in FIG. 4A, a support, such as a hitch 50, is attached to the underside of the rear of the fifth-wheel trailer 12. A winch assembly 52 mounted on top of the fifth-wheel trailer 12 draws in the winch line (not shown) in the same manner as described above so the boat trailer 14 rotates about a horizontal axis pivot 54 to an elevated position loaded on the fifth-wheel trailer 12. In the elevated position, the boat 16 rests against a cushion of the winch assembly 52. It will be understood that the winch assembly 52 can be mounted in a wide variety of locations, as long as the winch line is supported in an elevated position.

Figure 4B:
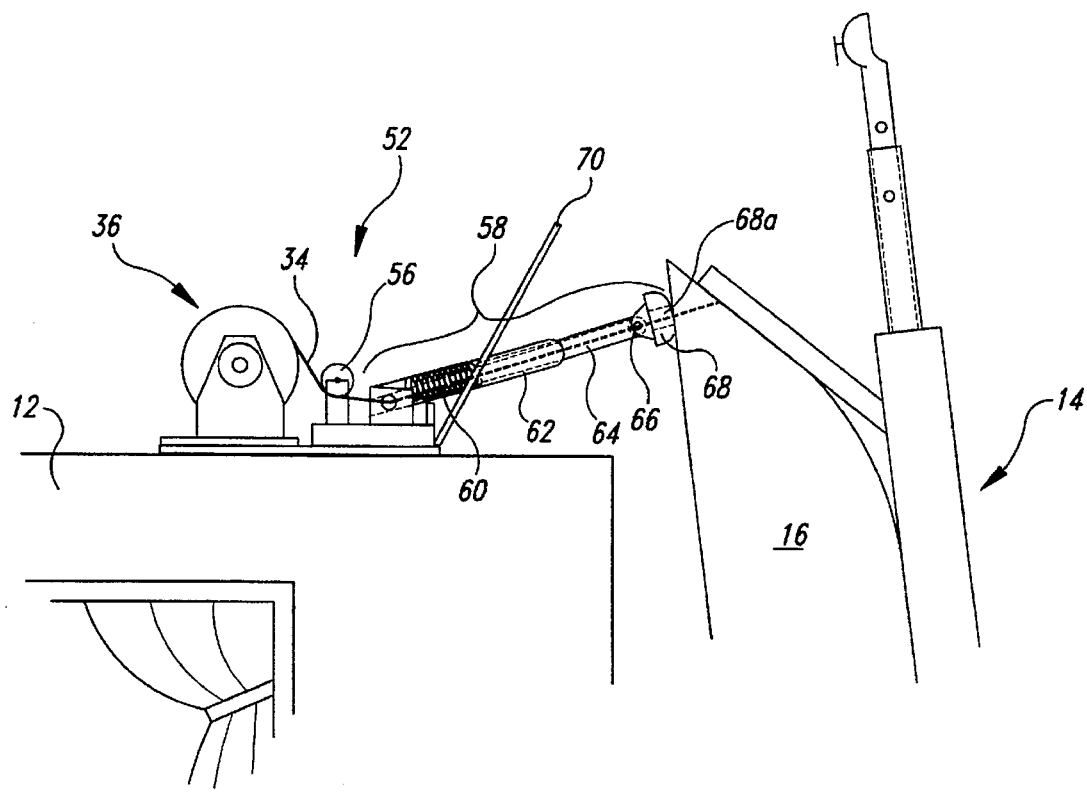

The winch assembly 52 is shown in more detail in FIG. 4B. The winch line 34 extends continuously from the winch 36, underneath a guide pulley 56 of a receiving arm 58 pivotably attached at one end to the top of the fifth-wheel trailer 12, through a spring 60, a tubular receiving member 62 and a tubular telescoping member 64, over a guide 66, and through a hole 68a in a cushion 68 attached to the other end of the receiving arm 58. In operation, the winch 36 draws the winch line 34 in until the boat 16 draws down against the cushion 68. As this occurs, the tubular telescoping member 64 slides into the tubular receiving member 62 and compresses the spring 60. When the winch 36 subsequently releases the winch line 34, the force from the energy stored in the compressed spring 60 pushes the boat 16 and the boat trailer 14 so they lean away from the fifth-wheel trailer 12. This eliminates any slack which would otherwise form in the winch line 34 as the winch 36 lets it out.

Figure 4C:
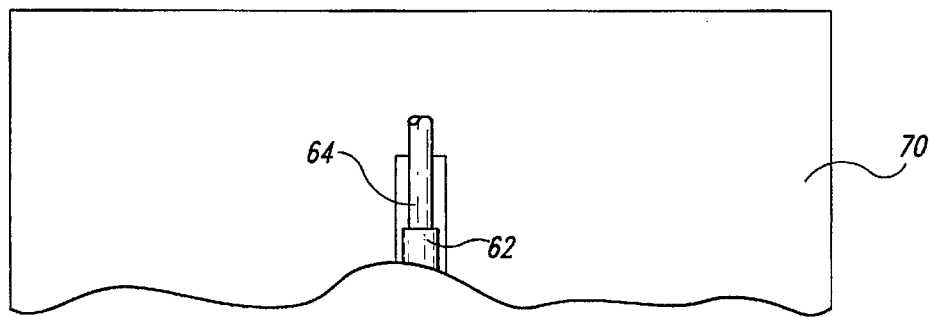

A wind shear plate 70 is mounted on an end to the top of the fifth-wheel trailer 12. When the trailer 12 is in motion, the wind shear plate 70 deflects air around the bow of the boat 16. Without the wind shear plate 70, air would catch in the bow of the boat 16 and unnecessarily stress the winch assembly 52. As shown in FIG. 4C in a view from the rear of the fifth-wheel trailer (not shown) looking forward, the wind shear plate 70 straddles the tubular receiving member 62 and the tubular telescoping member 64.

Figure 5:
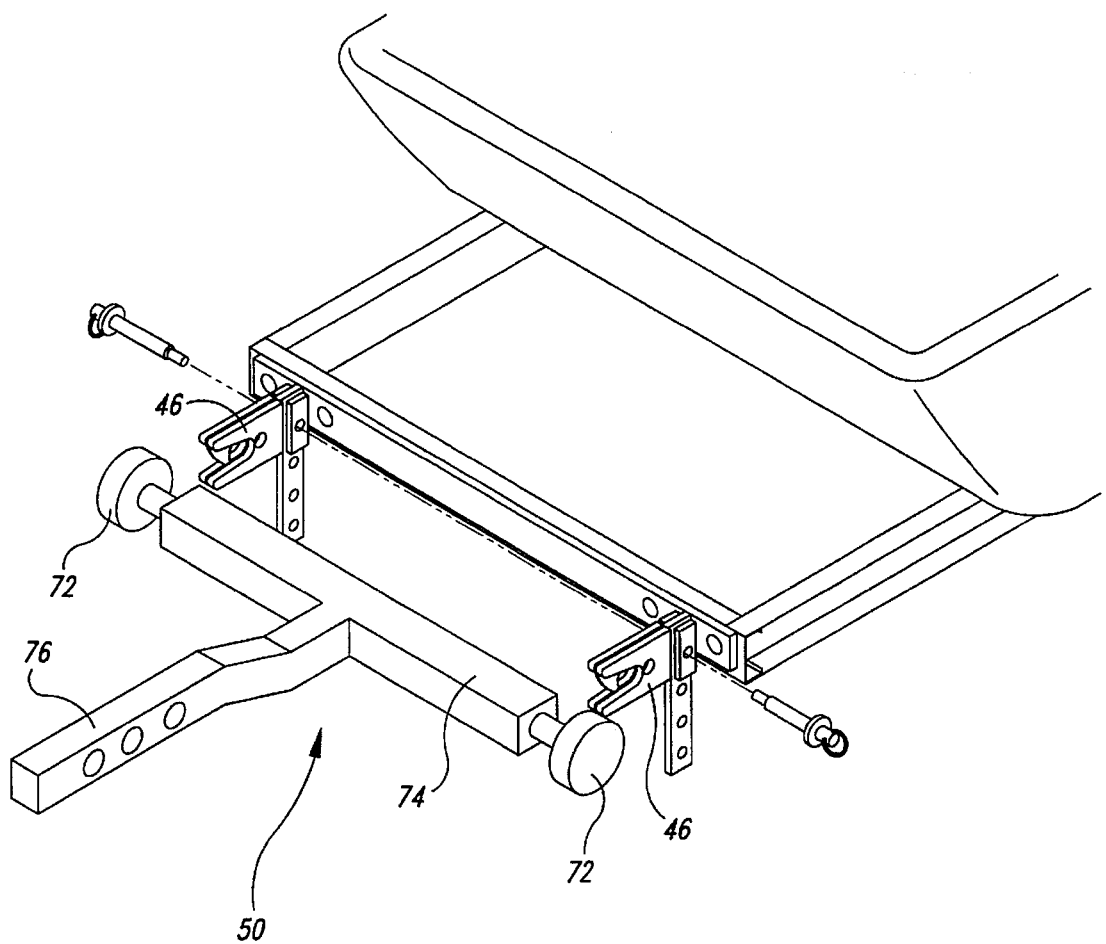
FIG. 5 is an isometric and exploded view of a hitch in the alternative loading device of FIGS. 4A, 4B and 4C.

The hitch 50 is shown in more detail in FIG. 5. Dogs 72 are fixed to opposing ends of a port-to-starboard extending member 74 which is integral with a fore-and-aft extending member 76. The dogs 72 pivotably couple to the latches 46 in the manner described above.

Figure 6:
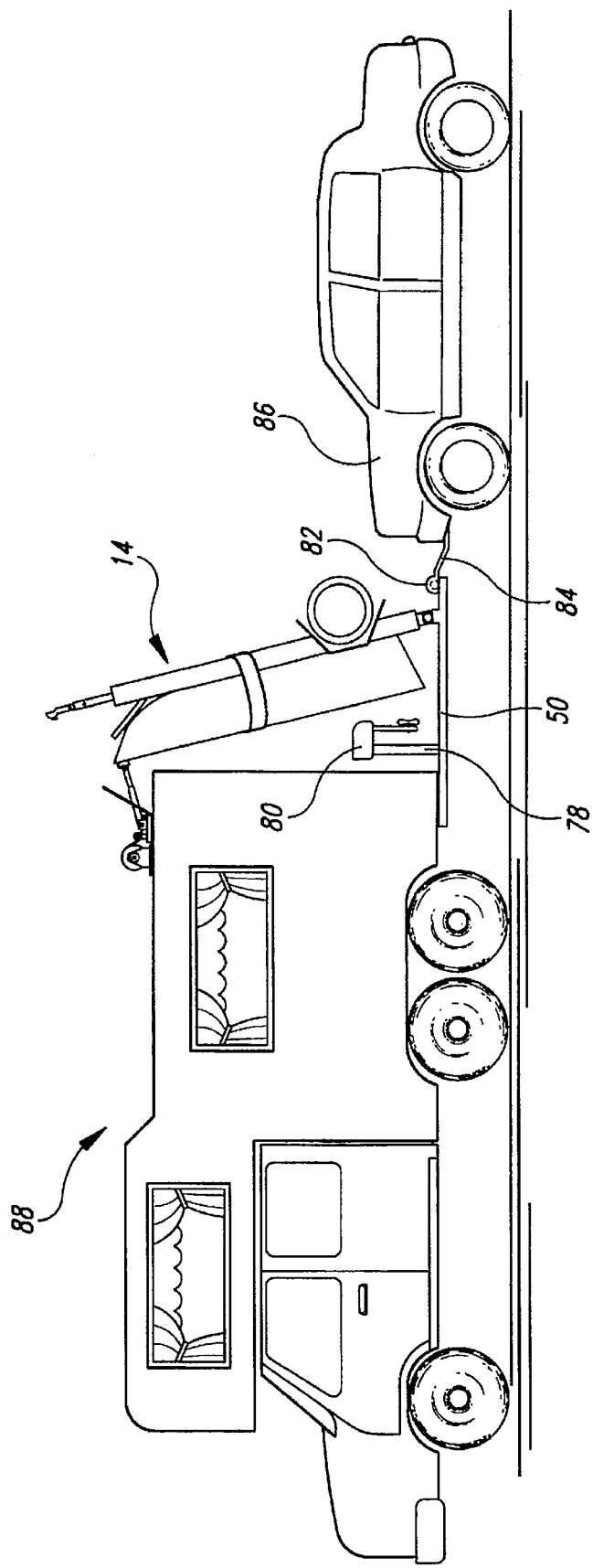
FIG. 6 is a side view of the alternative loading device of FIGS. 4A, 4B and 4C having a vertical boat motor mount and a ball fixed to the hitch.

As shown in FIG. 6, the hitch 50 can include a vertical boat motor mount 78 fixed to the hitch 50 and having a boat motor 80 conveniently mounted thereon. The hitch 50 can further include a ball 82 engaging a tow bar 84 attached to a tow vehicle 86. A vehicle 88 can thus advantageously tow the tow vehicle 86 at the same time it is carrying the boat trailer 14.

The described preferred and alternative embodiments of the present invention have many advantages. The described loading device allows a person to carry both a boat trailer and a boat at the same time, while still towing a tow vehicle. The vertical boat motor mount provides a convenient place to mount a boat motor. Also, because the loading device loads the boat trailer and boat in a vertical position, it requires less power and is less mechanically complex than a conventional loading device which positions the boat on the top of a vehicle. Further, a person towing a fifth-wheel trailer with a truck can easily disconnect the fifth-wheel trailer from the truck, unload the boat trailer and boat combination from the back of the fifth-wheel trailer, and then tow the boat and boat trailer together to a variety of locations while leaving the fifth-wheel trailer at a camping site. In addition, the telescoping tongue on the boat trailer allows the loading device to be used with vehicles having greater height than the vehicles conventional loading devices can be used with. Finally, if the boat and boat trailer combination accidentally detach from the winch assembly while the vehicle is moving, the boat and boat trailer will safely pivot to a horizontal position supported by the trailer support wheels.

Although the present invention has been described with reference to a preferred embodiment, the invention is not limited to this preferred embodiment. Rather, the invention is limited only by the appended claims, which include within their scope all equivalent devices or methods which operate according to the principles of the invention as described.

We claim:

1. A device for loading a secondary vehicle having opposing first and second ends onto the rear of a primary vehicle and supporting the secondary vehicle on the rear of the primary vehicle, the device comprising:

a support assembly having:

a first member attachable to the first end of the secondary vehicle;

a support member attachable to the rear of the primary vehicle;

releasable connectors to couple the first and support members and to thereby couple the first end of the secondary vehicle to the rear of the primary vehicle; and a horizontal, transverse pivot located in one of the first and second members; and a winch assembly supportable on the primary vehicle, the winch assembly having:

a winch; and a winch line attachable at an end to the winch, removably attachable at an opposing end to the second end of the secondary vehicle, and supportable in an elevated position at a point between its ends so that the winch can raise the second end of the secondary vehicle and thereby rotate the secondary vehicle about the horizontal pivot from a pre-loaded to an elevated position at the rear of the primary vehicle where it is supported on the support member in an upright position.

2. The loading device of claim 1 wherein the support member has a fore-and-aft extending member attachable at its forward end to the primary vehicle adjacent to the rear of the primary vehicle and projecting therefrom and a transverse member connected to the aft end of the fore-and-aft extending member and having outer ends and wherein the releasable connectors are pivot connectors connected to the outer ends of the transverse member.

3. The loading device of claim 2 wherein the releasable connectors include a plurality of pivot connectors positioned at a distance from each other which is sufficient to allow the pivot connectors to be viewable from a location adjacent to the second end of the secondary vehicle.

4. The loading device of claim 1 wherein the support member comprises a pair of fore-and-aft extending members attachable in a spaced-apart relation to the primary vehicle adjacent to the rear of the primary vehicle and projecting therefrom and the releasable connectors are pivot connectors connected to the aft ends of the fore and aft extending members.

5. The loading device of claim 4 wherein the releasable connectors include a plurality of pivot connectors positioned at a distance from each other which is sufficient to allow the pivot connectors to be viewable from a location adjacent to the second end of the secondary vehicle.

6. The loading device of claim 1 wherein the support assembly further comprises a vertical support member attached to the support member at a location between the horizontal pivot and the rear of the primary vehicle, and wherein the winch line is supportable in an elevated position on the vertical support member so that the secondary vehicle can rotate to the elevated position and engage the vertical support member.

7. The loading device of claim 6 wherein the winch is mountable on the vertical support member, and wherein the vertical support member includes a guide fixed thereto to guide and support the winch line.

8. The loading device of claim 1 wherein the support assembly further comprises a vertical boat motor mount fixed to the support member and projecting therefrom.

9. The loading device of claim 1 wherein the support assembly further comprises a tow ball connected to the support member to couple to a tow bar attachable to a tow vehicle so that the primary vehicle can tow the tow vehicle.

10. The loading device of claim 1 further comprising a wind shear plate connected to the primary vehicle so that the plate can deflect air around the secondary vehicle when the secondary vehicle is loaded on the primary vehicle and the primary vehicle is moving.

11. The loading device of claim 1 wherein the winch assembly further comprises a receiving arm having:

a tubular receiving member pivotably attached at a first end to the top of the primary vehicle;

a tubular telescoping member having a first end slidably engaging a second end of the tubular receiving member in a coaxial relation along a longitudinal axis of the tubular receiving member;

a cushion attached to a second end of the tubular telescoping member, the cushion having a hole, the cushion being located so that the hole is in a substantially axial relation with the tubular telescoping member;

a spring located in a coaxial relation with the tubular receiving member so that the spring is compressed when the tubular telescoping member slides relative to the tubular receiving member; and a guide fixed to the second end of the tubular telescoping member so that it guides and supports the winch line extending fore and aft continuously from the winch, through the tubular receiving member, axially through the spring, through the tubular telescoping member, over the guide, and through the cushion hole, the guide thereby allowing the winch and the winch line to pull the secondary vehicle into the elevated position on the rear of the primary vehicle so that the second end of the secondary vehicle presses against the cushion and the tubular telescoping member and compresses the spring so that the spring can push the secondary vehicle away from the rear of the primary vehicle when the winch releases the winch line.

12. A trailer loading system for loading and supporting a trailer on the rear of a vehicle, the system comprising:

a trailer having support wheels and a fore-and-aft extending carriage frame having an aft end opposing a fore end having a tongue;

a support assembly having:

a first member attachable to the aft end of the trailer carriage frame;

a support member attachable to the rear of the vehicle;

releasable connectors to couple the first and support members and to thereby couple the trailer carriage frame to the rear of the vehicle; and a horizontal, transverse pivot located in one of the first and second members; and a winch assembly supportable on the vehicle, the winch assembly having:

a winch; and a winch line attachable at an end to the winch, removably attachable at an opposing end to the fore end of the trailer carriage frame, and supportable in an elevated position at a point between its ends so that the winch can raise the tongue of the trailer carriage frame and thereby rotate the trailer about the horizontal pivot from a horizontal position in which it is supported on its support wheels to an elevated position at the rear of the vehicle where it is supported on the support member in an upright position.

13. The trailer loading system of claim 12 wherein the support member comprises a pair of fore-and-aft extending members attachable in a spaced-apart relation to the vehicle adjacent to the rear of the vehicle and projecting therefrom and wherein the releasable connectors are pivot connectors connected to the aft ends of the fore and aft extending members.

14. The trailer loading system of claim 13 wherein the releasable connectors include a plurality of pivot connectors positioned at a distance from each other which is sufficient to allow the pivot connectors to be viewable from a location adjacent to the fore end of trailer carriage frame when the trailer is carrying a boat.

15. The trailer loading system of claim 12 wherein the tongue is a telescoping tongue for slidably engaging a tubular projection of the trailer carriage frame in a coaxial relation, the tongue thereby being capable of contracting when the trailer is loaded on the rear of the vehicle so that a distance the tongue extends above the top of the vehicle is minimized.

16. The trailer loading system of claim 12 further comprising a wind shear plate connected to the vehicle so that the plate can deflect air around a boat carried on the trailer when the trailer is loaded on the vehicle and the vehicle is moving.

17. The loading device of claim 12 wherein the support assembly further comprises a vertical support member attachable to the support member at a location between the horizontal pivot and the rear of the vehicle, and wherein the winch line is supportable in an elevated position on the vertical support member so that the trailer can rotate to the elevated position and engage the vertical support member.

18. The trailer loading system of claim 12 wherein the support member has a fore-and-aft extending member attachable at its forward end to the vehicle adjacent to the rear of the vehicle and projecting therefrom and a transverse member connected to the aft end of the fore-and-aft member and having outer ends and wherein the releasable connectors are pivot connectors connected to the outer ends of the transverse member.

19. A trailer loading system for a vehicle, the system comprising:

a trailer having support wheels and a fore-and-aft extending carriage frame having an aft end opposing a fore end having a tongue;

a support comprising:
      a first member attachable to the aft end of the trailer carriage frame;
      a second member attachable to the rear of the vehicle;
      releasable connectors to couple the first and second members and to thereby couple the trailer carriage frame to the rear of the vehicle; and
      a horizontal axis pivot located in one of the first and second members;

a winch assembly supportable on the vehicle, the winch assembly comprising:
      a winch; and
      a winch line attachable at an end to the winch, removably attachable at an opposing end to the fore end of the trailer carriage frame, and supportable in an elevated position at a point between its ends so that the winch can raise the tongue of the trailer carriage frame and thereby rotate the trailer about the horizontal axis pivot from a horizontal position in which it is supported on its support wheels to an elevated position in which it is supported from the rear of the vehicle by the support; and a vertical support member attachable at a first end to the second member at a location between the horizontal axis pivot and the rear of the vehicle wherein the winch line is supportable in an elevated position on the vertical support member near a second end of the vertical support member so that the trailer can rotate to an elevated position leaning toward the rear of the vehicle, and supported by the vertical support member.

20. The trailer loading system of claim 19 wherein the winch is mountable on the vertical support member, and wherein the vertical support member includes a guide fixed to its second end to guide and support the winch line extending fore and aft continuously from the winch and over the guide.

21. A method for loading a secondary vehicle having opposing first and second ends onto the rear of a primary vehicle having an attached spring, the method comprising:

providing the secondary vehicle in a substantially horizontal position adjacent to the rear of the primary vehicle;

pivotably and disengageably connecting the first end of the secondary vehicle to the rear of the primary vehicle;

elevating the second end of the secondary vehicle so that the secondary vehicle rotates from its substantially horizontal position to an elevated position in which it is supported on the rear of the primary vehicle;

leaning the secondary vehicle toward the rear of the primary vehicle and thereby compressing the spring;

releasably holding the secondary vehicle in the elevated position;

releasing the secondary vehicle and thereby allowing the compressed spring to push the secondary vehicle to a position leaning away from the rear of the primary vehicle; and lowering the second end of the secondary vehicle so that the secondary vehicle rotates to its substantially horizontal position.

* * * * *